(12) United States Patent  (10) Patent No.: US 7,587,289 B1
Sivertsen  (45) Date of Patent: Sep. 8, 2009

(54) DATA CABLE POWERED SENSOR FIXTURE (75) Inventor: Clas Gerhard Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 11/674,313

(22) Filed: Feb. 13, 2007

(51) Int. Cl.
*G01D 18/00* (2006.01)
*F21S 8/00* (2006.01)

(52) U.S. Cl. .............. 702/91; 702/4; 362/147

(58) Field of Classification Search .......... None
See application file for complete search history.

(56) References Cited

U.S. PATENT DOCUMENTS

| 4,383,244 | A | 5/1983 | Knauff | |
|---|---|---|---|---|
| 5,156,454 | A | 10/1992 | White | |
| 5,489,891 | A | 2/1996 | Diong et al. | |
| 6,004,011 | A | 12/1999 | Sieczkowski | |
| 6,283,768 | B1 | 9/2001 | Van Naarden | |
| 6,340,868 | B1 * | 1/2002 | Lys et al. | 315/185 S |
| 6,659,947 | B1 | 12/2003 | Carter et al. | |
| 6,719,438 | B2 * | 4/2004 | Sevack et al. | 362/147 |
| 6,903,380 | B2 * | 6/2005 | Barnett et al. | 257/98 |
| 7,038,398 | B1 * | 5/2006 | Lys et al. | 315/291 |
| 7,228,190 | B2 * | 6/2007 | Dowling et al. | 700/94 |
| 2002/0038157 | A1 * | 3/2002 | Dowling et al. | 700/90 |
| 2002/0113714 | A1 | 8/2002 | Lopez | |
| 2003/0065472 | A1 * | 4/2003 | Eckel et al. | 702/130 |
| 2003/0151917 | A1 | 8/2003 | Daughtry et al. | |
| 2005/0083704 | A1 | 4/2005 | Pohlert et al. | |
| 2005/0122064 | A1 * | 6/2005 | Chevalier et al. | 315/291 |
| 2008/0139881 | A1 * | 6/2008 | Cover et al. | 600/103 |

FOREIGN PATENT DOCUMENTS

JP 2004-310149 A 11/2004

OTHER PUBLICATIONS

"LM5070 Integrated Power Over Ethernet PD Interface and PWM Controller," National Semiconductor Corporation, DS201200, Apr. 2006, pp. 1-17.
U.S. Appl. No. 11/674,221, filed Feb. 13, 2007, entitled "Data Cable Powered Light Fixture," Inventor: Clas Gerhard Sivertsen.
U.S. Official Action dated Aug. 20, 2008 in U.S. Appl. No. 11/674,221.
Amendment and Response dated Sep. 16, 2008 to U.S. Official Action dated Aug. 20, 2008 in U.S. Appl. No. 11/674,221.
U.S. Official Action dated Jan. 8, 2009 in U.S. Appl. No. 11/674,221.
Amendment and Response dated Mar. 18, 2009 to U.S. Official Action dated Jan. 8, 2009 in U.S. Appl. No. 11/674,221.
U.S. Official Action dated May 28, 2009 in U.S. Appl. No. 11/674,221.

* cited by examiner

*Primary Examiner*—Bryan Bui
*Assistant Examiner*—Jonathan Teixeira Moffat
(74) *Attorney, Agent, or Firm*—Hope Baldauff Hartman, LLC (57) ABSTRACT

A sensor fixture can be affixed within a wall and powered using the same cable along which data signals are transmitted. A data cable is attached to the fixture, and power for a sensor is isolated from the data signals. The sensor may be used in conjunction with a building automation system in order to provide environmental inputs, such as from a motion sensor, a light sensor, and an audio sensor. The sensor may also be combined with LED lights for a combined fixture that lights when sensing motion or other environmental changes, for example.

20 Claims, 12 Drawing Sheets

DATA CABLE POWERED SENSOR FIXTURE

BACKGROUND

Building automation can be described as a network of intelligent components that can work independently or in concert to monitor and control the mechanical and environmental systems in a structure or outdoor facility. Home automation is the use of building automation principles and technologies in the home. Intelligent components can include motion and temperature sensors, lights, heating and air conditioning systems, security and alarm systems, as well as numerous other devices and systems that can be controlled in an automated fashion. The ultimate goals of building automation include reducing energy and maintenance costs, in addition to automating mundane tasks.

Automation components typically require both a power connection and a control/data connection at a minimum to function fully. In a home or building with multiple sensors, thermostats, lights, and other components, this need for two cables per component (i.e., a power cable and a control/data cable) can lead to multiple problems. For example, each component may require a non-standard control/data cable wired all the way back to a central controller unit, in addition to needing a power cable. The use of so many wires can lead to additional potential points of failure, and adding additional components can be cumbersome in that each new component requires a control/data cable run back to the central controller unit. Moreover, the use of so many wires, especially non-standard wires, can be expensive.

Many automation components can be programmed to turn on and off at optimal times helping to conserve resources. However, automation components do not necessarily utilize innovative power-saving techniques and technologies to further conserve those resources. In addition, existing automation components do not typically offer programmable features other than power on and power off. For example, lights and sensors may have attributes and settings that are not programmatically controlled in current automation settings.

It is with respect to these considerations and others that embodiments of the present invention have been made.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments provide a sensor fixture that uses a single data cable to supply both electrical power and data. The sensor fixture may utilize the Power over Ethernet standard to power one or more environmental sensors such as a motion sensor. The sensor fixture includes circuitry to isolate power and data delivered via the data cable. The power is converted to a voltage sufficient to run the sensor(s), and data is communicated to and from a control circuit that can control the sensitivity and other aspects of the sensor(s).

Embodiments also provide a method for powering and communicating with a sensor fixture using a single data cable. The sensor fixture receives power and data communications via the data cable and isolates the two. The fixture then receives an instruction via the data communications and modifies an aspect of the sensor(s) based on the instruction. The sensor(s) are run using the power received via the data cable.

Embodiments additionally provide a sensor fixture that combines a sensor with one or more LED lights that produce light sufficient for illumination. The power for both the sensor and the LED lights is provided via a connected data cable. The sensor may trigger the lights to shine automatically upon detecting a motion or other environmental change.

Other methods and/or computer-readable media according to embodiments will be or become apparent to one with skill in the art upon review of the following drawings and Detailed Description. It is intended that all such additional methods and/or computer-readable media be included within this description, be within the scope of the present invention, and be protected by the accompanying claims.

DETAILED DESCRIPTION

The following detailed description is directed to apparatuses and methods for powering home automation components such as lights and sensors utilizing a data cable. In the following detailed description, references are made to the accompanying drawings that form a part hereof, and which are shown, by way of illustration, using specific embodiments or examples. Referring now to the drawings, in which like numerals represent like elements throughout the several figures, aspects of the various implementations and an illustrative operating environment provided herein will be described.

Figure 1:
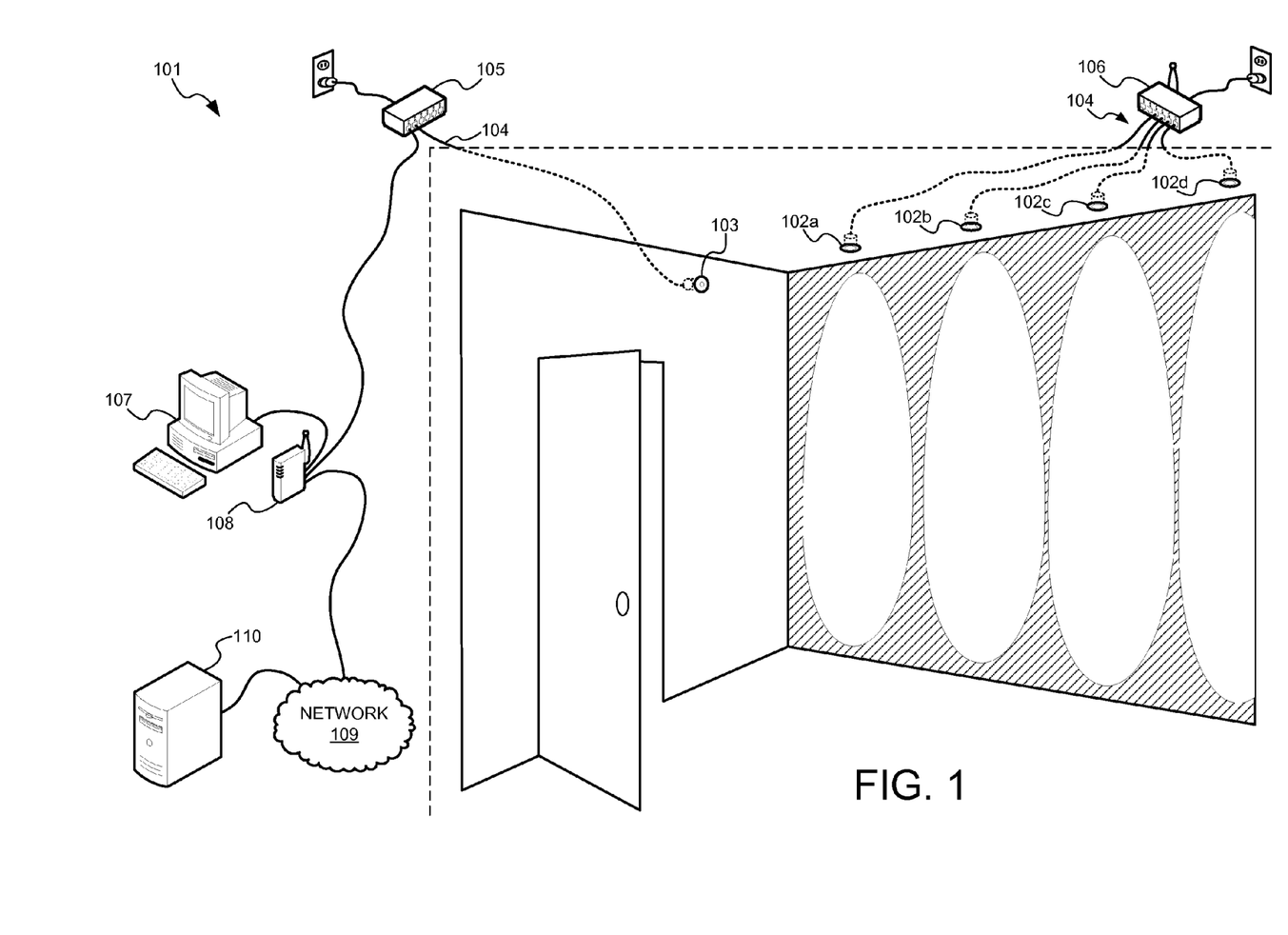
FIG. 1 is a system diagram depicting components of a data cable powered building automation system according to one or more embodiments.

FIG. 1 depicts various components of a data cable powered building automation system 101 according to one or more embodiments. The system 101 presented is one example among numerous systems which may include the use of data cable powered automation components, such as light fixtures 102a, 102b, 102c, 102d (collectively light fixture(s) 102) and a sensor fixture 103, connected via data cables 104. The system 101 may also include backend components such as powered hubs 105, 106, a local computer 107, a broadband device 108, a network 109, and a remote computer 110.

The light fixture 102 is an automation component in that it can be controlled by instructions executing within the light fixture, or alternatively by instructions executing on the local computer 107 or the remote computer 110, for example. The light fixture 102 can minimally be powered on or off in an automated fashion. Other aspects of the light fixture 102 may be controlled, including brightness and color. More details of the circuitry within the light fixture 102 are provided below with respect to FIG. 2.

The sensor fixture 103 is an automation component that can also be controlled by instructions executing within the fixture, by instructions executing on the local computer 107 or the remote computer 109. The sensor fixture 103 also can provide environmental feedback for use as an input to a program or set of instructions. For example, the sensor may supply an electrical signal indicating a sensed aspect of the immediate environment, for example a light level, a motion, a noise, an odor, or temperature. The sensor fixture 103 may include aspects that may be controlled, including power on or off, sensitivity, and range for example. As with the light fixture 102, additional information regarding the circuitry of the sensor fixture 103 is provided below.

Data cables 104 may include any cable capable of transmitting data signals and power. The data cables 104 of FIG. 1 connect powered hubs 105, 106, sometimes referred to as power sourcing equipment (PSEs), with the data cable powered light fixtures 102 and sensor fixture 103, collectively referred to as powered devices (PDs). In a data cable 104 having multiple data wires bundled within, each wire is capable of carrying the lower electrical currents typically required for data signals. For example, an RJ-45 cable includes eight wires bundled together, each wire being typically a 24-gauge wire. A typical power cable, on the other hand, may include thicker 12-gauge wire, intended for carrying much higher currents associated with power delivery.

Despite the diminutive thickness of their constituent wires, data cables 104 are capable of delivering current for lower-power use. The Power over Ethernet (PoE) standard, for example, defines technologies and standards for sourcing power over data cables 104 conventionally used in a network of computers. Using data cables 104 as a power delivery vehicle, the light fixtures 102 and the sensor fixture 103 each require only a single cable connection to function.

Control signals may be sent from the local computer 107 via the broadband device 108 to the powered hubs 105, 106 either wired or wirelessly. The control signals then continue to the PDs, including the sensor fixture 103 and the light fixtures 102. Each PD has its own network address, such as a media access control (MAC) address and/or an Internet Protocol (IP) address, enabling communication between each PD and other PDs, the computer 107, or other components of the system 101. The control signals may directly request or trigger a setting change or a program execution on each of the PDs. Likewise, the control signals may supply new program code for storage and execution within each PD.

The broadband device 108 may be, for example, a cable modem, a digital subscriber line (DSL) modem, a wired and/or wireless router, or some combination thereof. The broadband device may allow components within a building to communicate via the network 109 (e.g., the Internet) with other users and systems such as the remote computer 110. Likewise, the remote computer 110 can in turn communicate with the PDs and with other components of the system 101. The network connection may allow the light fixtures 102 and/or the sensor fixture 103 to download patches, drivers, and program code via the network 109. Likewise, the computer 107 may be used to download and then install such additional program code on the PDs.

The system 101 can be used to automate such functions as turning on lights automatically. When a person enters a room, for example, the sensor fixture 103 may sense the movement and/or light from the door and send a signal to the local computer 107, which may in turn activate the light fixtures 102. Alternatively, the sensor fixture 103 communicates directly with the light fixtures 102, which then turn themselves on. The sensor fixture 103 may alternatively sense music and use digital signal processing to isolate a beat from the music, a beat that may then be used to pulse and cycle the light fixtures 102 through various colors. The hardwired instructions and/or software code required to perform these automated functions may be stored and executed within the computer 107, within the remote computer 110, within the sensor fixture 103, within the light fixtures 102, some combination thereof.

Figure 2:
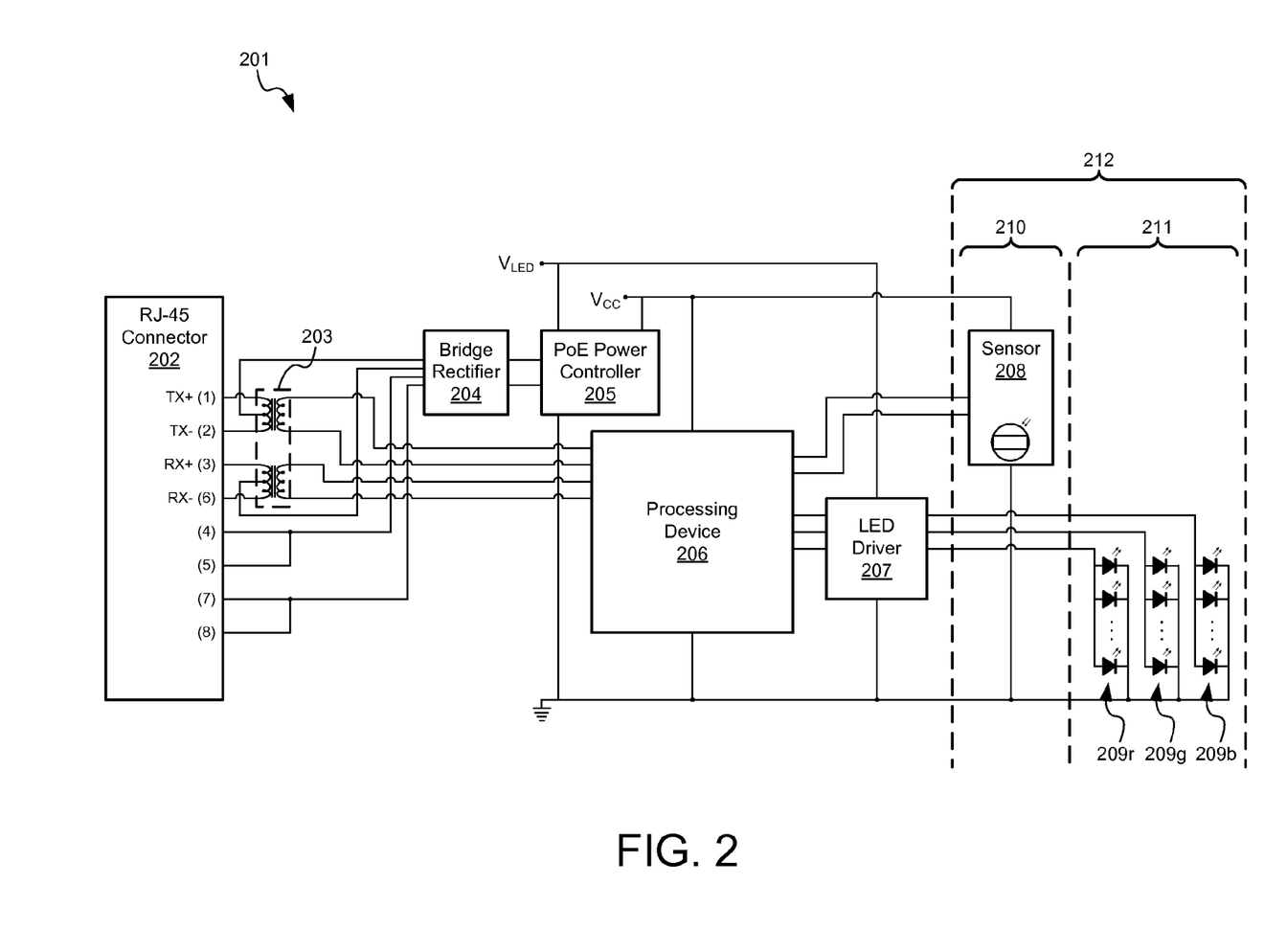
FIG. 2 is a schematic diagram depicting an electrical circuit for one or more data cable powered automation components according to one or more embodiments.

An example of a design for the PDs described above will now be discussed with respect to FIG. 2, which is a schematic diagram depicting a circuit 201 for use with a data cable powered automation component. The circuit 201 may be used for a sensor fixture 103, a light fixture 102, a fixture combining both a sensor and a light, or another data cable powered automation component. Although, the example of FIG. 2 provides a schematic diagram for one or more PoE-enabled automation components, any data cable powered automation component may use this or similar electronics. The electronics shown in the circuit 201 are intended to be representative of functional components and are not intended to exclude additional components.

An RJ-45 connector 202 may represent a socket or a plug, depending on the type of data cable 104 used to connect to the circuit 201. Other types of standard or not standard data connectors may similarly be used to source a combined data and power connection. The TX and RX pins of the connector 202 are attached to a set of magnetics 203 that are used to isolate data signals from the power supplied by the pins. Power supplied by all of the wires in a data cable 104 are routed to a bridge rectifier 204 for converting alternating or varying current (AC) into direct current (DC). The resulting DC voltage is utilized by a PoE power controller 205, which generates one or more source voltages (e.g., $V_{CC}$ and $V_{LED}$). The source voltages may be used by other components within the circuit 201. The PoE power controller 205 also communicates with circuitry in the PSE via the data cable 104 in order to negotiate a necessary power level for consumption by the circuit 201. The PoE power controller 205 may work in conjunction with one or more DC-to-DC converters to supply the one or more source voltages.

The isolated data signals from the set of magnetics 203 serve as inputs to a processing device 206. The processing device 206 may be a microcontroller, a microprocessor, an application specific integrated circuit (ASIC), a field programmable gate array (FPGA), and also may integrate on-board memory such as flash memory, as well as a network controller, including the physical layer interface. Examples of such integrated products are the PIC18F97J60 Family of High Performance 1 Megabyte Flash Microcontrollers with Ethernet from MICROCHIP TECHNOLOGY, INC. Other configurations of the circuit 201 may separate the integrated portions of the processing device 206 into a separate memory, a separate network controller, and so forth.

The processing device 206 transmits and receives communications from a remote device via the data cable 104, and also uses power supplied by the data cable to source its computations. The processing device 206 may store instruction in on-chip flash memory and execute the instructions for receiving environmental input from the sensor 208, as well as instructions for adjusting aspects of the sensor 208. The sensor input may be transmitted to a remote device, such as the computer 107, via the data cable 104. Instructions for adjusting aspects of the sensor 208 may be received from the remote device utilizing the data cable 104. Similarly, the processing device 206 may execute instructions that signal to the LED driver 207 to turn on and off the LEDs 209r, 209g, 209b (collectively LEDs 209). The LED driver 207 may control color by adjusting the power to each of the colors and mixing the colors appropriately. Likewise, the LED driver 207 may use pulse width modulation to turn the LEDs 209 on or off for more or less time in a regular cycle in order to simulate more or less brightness, enabling color mixing. By flashing the LEDs 209 quickly but for shorter periods of time, for example, the light produced is perceived by a viewer to be less bright.

The LEDs 209 are of a high-output variety that is intended to produce light used for illumination rather than typical LEDs used merely for indication. The LEDs 209 may collectively produce a light of greater than, for example, 100 lumens. Conventional indication-only LEDs use only 30-60 milliwatts of power. High-output LEDs used for illumination can consume half a watt or more, although newer high efficiency LEDs can produce more light with less power.

Although the circuit 201 provides for both a sensor 208 and LEDs 209, any particular data cable powered automation component may only have one or the other component. The sensor fixture 103, for example, may include only the sensor 208, without the LED driver 207 and the LEDs 209. Similarly, the light fixture 102 may include only the LED driver 207 and the LEDs 209 without the sensor 208. In addition, the sensor 208 and the LEDs 209 may be part of replaceable or removable assemblies or cartridges. For example, the sensor 208 may be part of a sensor assembly 210 which may be easily removed when making repairs. Likewise, the LEDs 209 may be part of a light assembly or cartridge 211, making it easy to replace a set of LEDs all at once. Combining the LEDs 209 and the sensor 208 in a single fixture 212 may enable a combination fixture that both senses the environment and adjusts its own light as a reaction to the environment. More information regarding such a combination fixture is provided below with respect to FIGS. 11A and 11B.

Figure 3A:
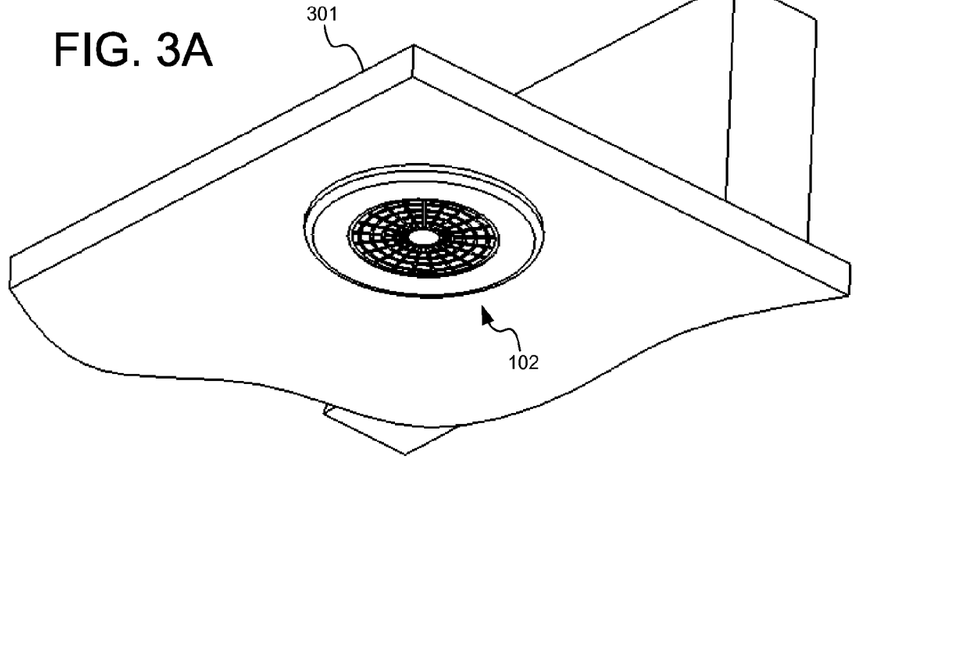
FIGS. 3A and 3B are perspective views of installed data cable powered light fixtures according to one or more embodiments.
Figure 3B:
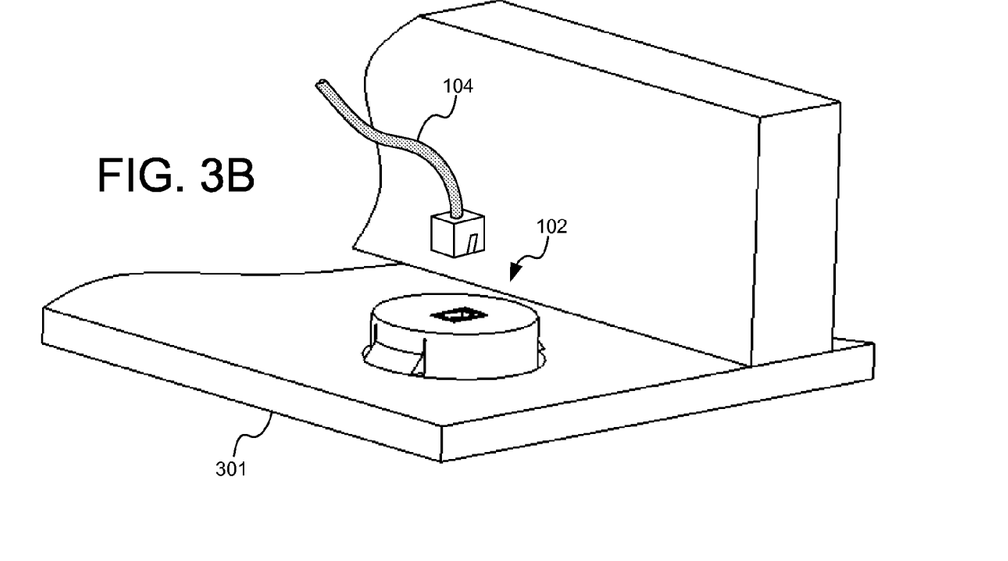

FIGS. 3A and 3B depict two perspective views of an example of the light fixture 102 installed in a wallboard 301. The wallboard 301 may be a piece of sheetrock installed as a wall in a building, or installed as a ceiling. The wallboard 301 may also be a ceiling tile, or any other wall or ceiling covering. The light fixture 102 has been installed by inserting the body of the fixture through a hole made in the wallboard. The data cable 104 is then attached to the data cable connector, which may be an RJ-45 connector 202, supplying both power and data to the light fixture 102. The light fixture 102 may be installed to produce a focused light beam, such as an accent light, or to produce a broad light beam to light a room.

Figure 4:
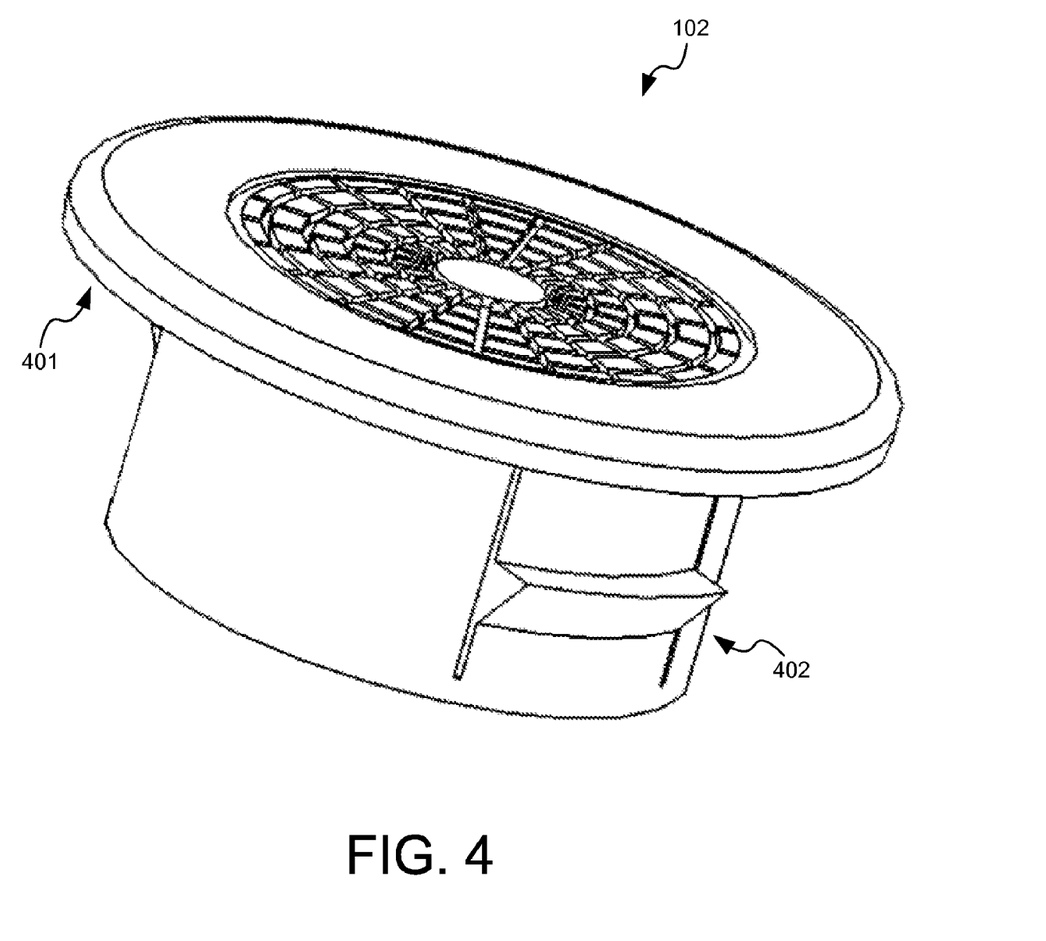
FIG. 4 is an exterior perspective view of a data cable powered light fixture according to one or more embodiments.

FIG. 4 depicts an exterior perspective of the example of the light fixture 102. The light fixture 102 includes an exterior flange 401, which acts as a lip that rests against the exterior of the wallboard 301. The light fixture 102 also includes a flexible barbed member 402, which flexes and locks against the interior of the wallboard 301. As such, when installing the light fixture 102, the body of the fixture is slid into a hole in the wallboard 301, until the exterior of the wallboard is in contact with the exterior flange 401 and the flexible barbed member 402 has locked against the interior of the wallboard.

Figure 5:
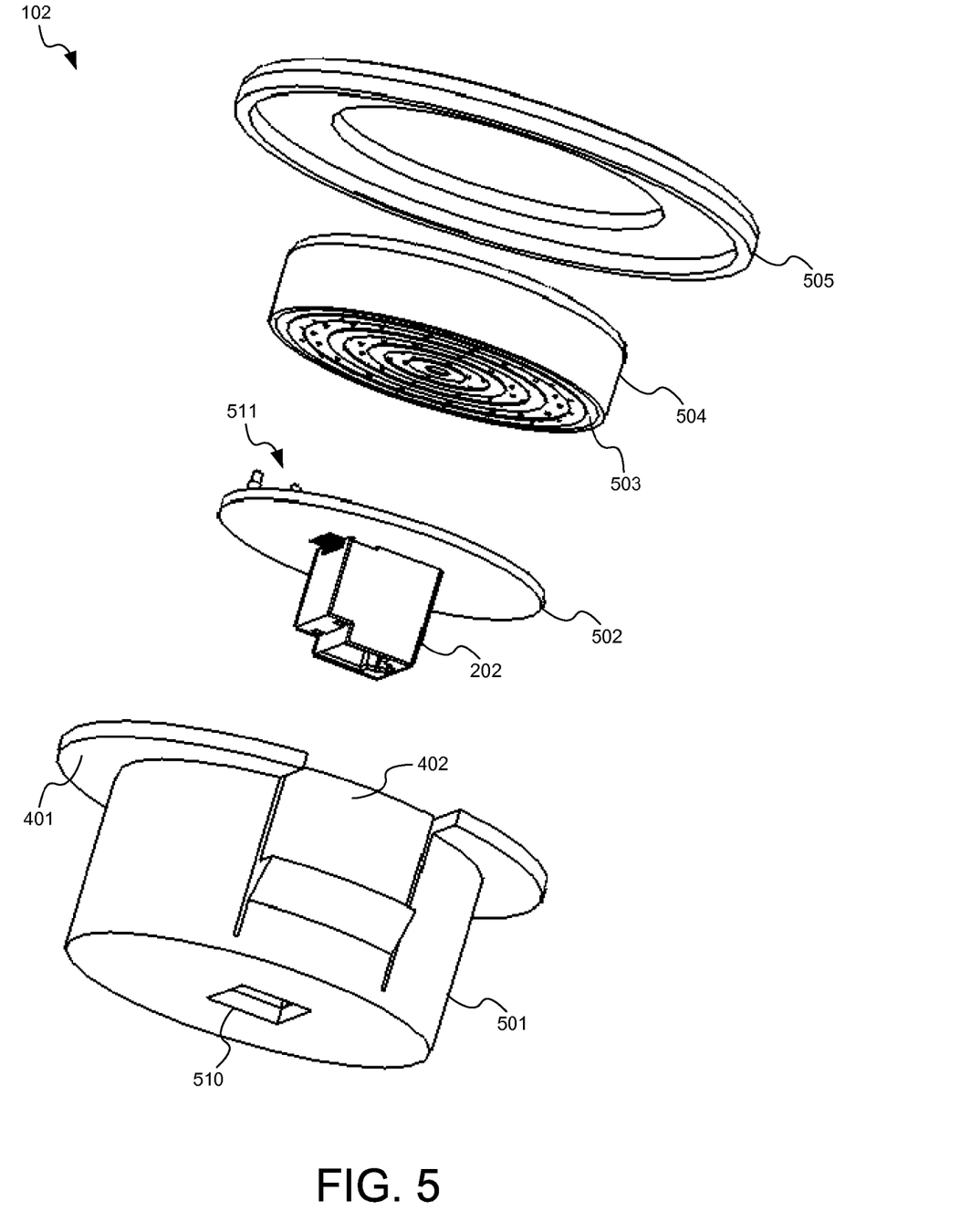
FIG. 5 is an exploded view of a data cable powered light fixture according to one or more embodiments.

FIG. 5 is an exploded view of the example of the light fixture 102. The light fixture 102 includes a hollow body 501, a circuit board 502, an LED cartridge 503, a translucent cover 504, and a locking ring 505. The hollow body 501 encloses the circuit board 502, the LED cartridge 503, and the translucent cover 504. The hollow body 501 includes an opening 510 for the RJ-45 connector 202, as well as the exterior flange 401 and the flexible barbed member 402. The hollow body 501 may additionally include exhaust holes to allow heat to escape from the interior of the light fixture 102. The circuit board 502 may include circuitry similar to the circuit 201 of FIG. 2, including contacts 511 for electrically connecting the LED cartridge 503. Additional information regarding the LED cartridge 503 is provided below with respect to FIGS. 7A through 7C. When assembled, the circuit board 502 may be permanently affixed within the hollow body 501, and the LED cartridge 503 and the translucent cover 504 may be held in place with the locking ring 505.

Figure 6:
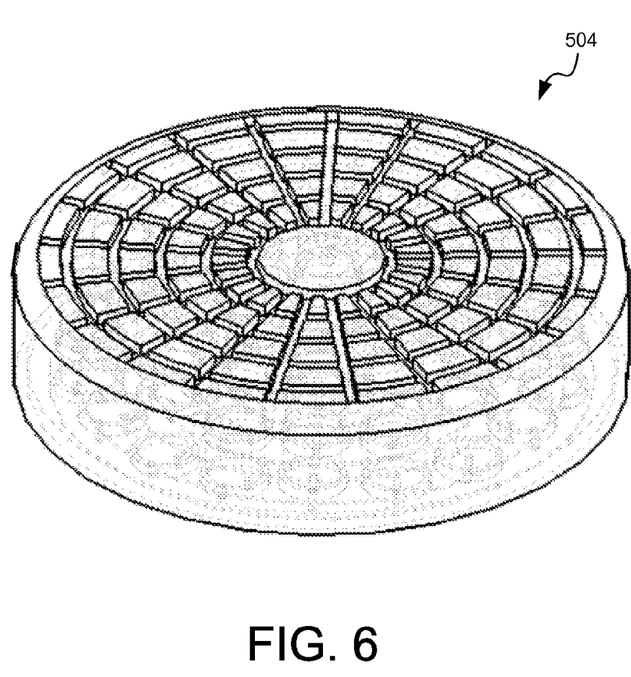
FIG. 6 is a perspective view of a translucent cover for a data cable powered light fixture according to one or more embodiments.

FIG. 6 depicts a perspective view of an example of the translucent cover 504 for the light fixture 102. Although described as translucent, the translucent cover 504 may be completely clear and/or may include a tint or color to modify the light from the LEDs 209. The translucent cover may be described as a non-opaque cover. The translucent cover 504 may vary in thickness and surface features in order to diffuse and/or focus light. For example, the surface of the translucent cover 504 may be curved, creating a lens for focusing light, as with accent lighting. The translucent cover 504 may also include exhaust holes to allow heat to escape the interior of the light fixture 102.

Figure 7A:
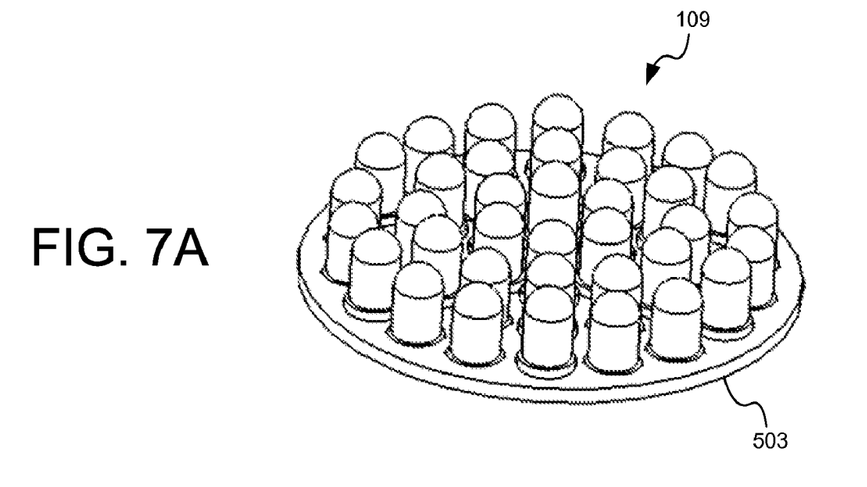
FIGS. 7A through 7C are perspective, top, and bottom views respectively of an LED light cartridge according to one or more embodiments.
Figure 7B:
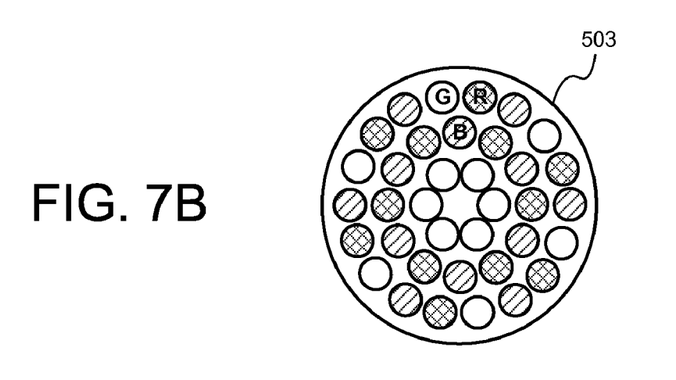
Figure 7C:
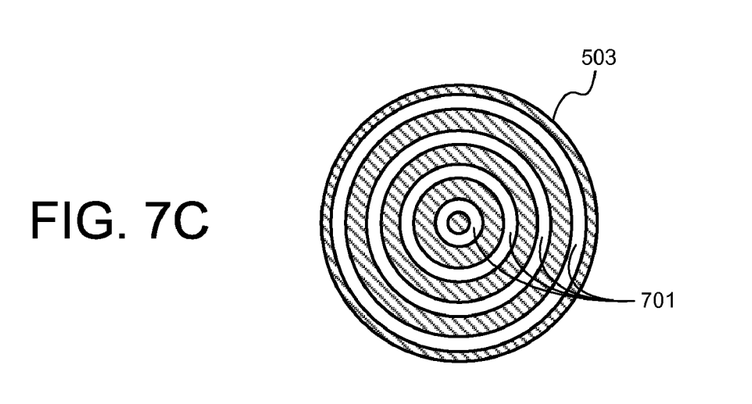

FIGS. 7A through 7C are perspective, top, and bottom views respectively of the example of the LED cartridge 503. Each of the LEDs 209 on the LED cartridge 503 may be the same color, such as white. Alternatively, the LEDs 209 may each be one of three different colors, specifically red, green, and blue. FIG. 7B depicts one possible pattern of red, green, and blue LEDs for use with the LED cartridge 503. By using the three colors, the circuit 201 can control the brightness of each color set of LEDs and therefore control the overall color produced by the light fixture 102. The color may be changed and cycled dynamically by varying the brightness of each color over time. By modifying the brightness of colors with respect to each other, most every visible color can be created, or at least the overall perception of any color can be created. The bottom of the LED cartridge 503 includes several electrical contacts 701. The electrical contacts are rings in the example of FIG. 7C so that inserting the LED cartridge 503 onto the contacts 511 of the circuit board 502 does not require a particular orientation to the cartridge.

Figure 8A:
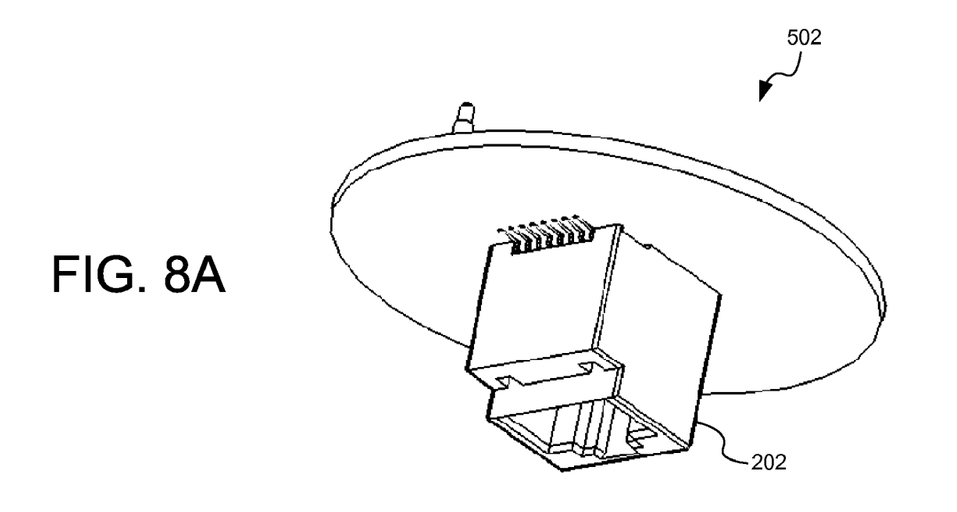
FIGS. 8A and 8B are perspective views of an interior circuit board for a data cable powered light fixture according to one or more embodiments.
Figure 8B:
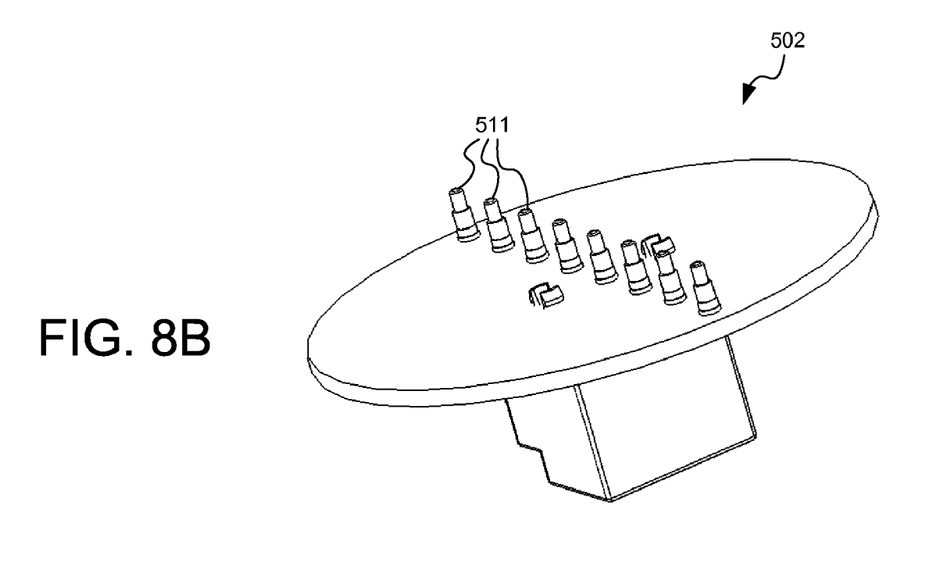

FIGS. 8A and 8B are perspective views of the circuit board 502 for the example of the light fixture 102. For ease of illustration, the circuit board 502 does not show many of the electrical components of the circuit 201 which may be mounted thereon. The circuit board 502 includes the contacts 511 for electrically connecting the LED cartridge 503. The contacts 511 may be spring-loaded telescoping contacts that help to hold the LED cartridge 503 in place and guarantee an electrical connection. Although depicted in a straight line, the telescoping contacts may be placed in any configuration so as to guarantee contact with and stability of the LED cartridge 503.

Figure 9:
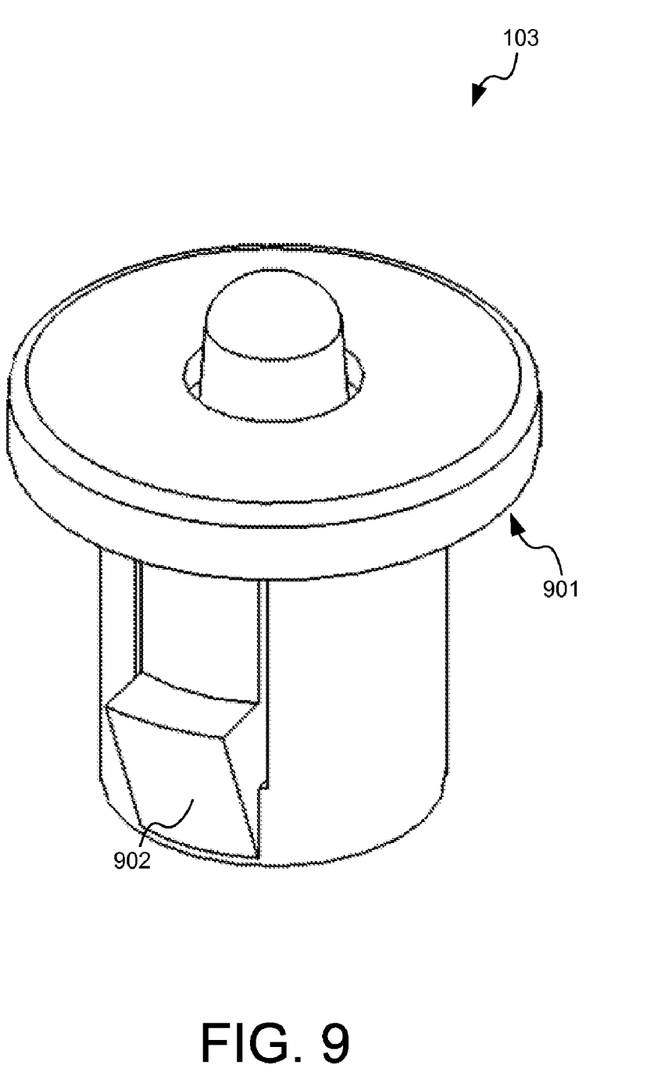
FIG. 9 is an exterior perspective view of a data cable powered sensor according to one or more embodiments.

FIG. 9 is a perspective view of an example of the sensor fixture 103. The sensor fixture 103 has a mechanical design similar to the light fixture 102, described above. The exterior of the sensor fixture 103 includes an exterior flange 901 and a flexible barbed member 902 which together help secure the fixture within a wall. The sensor fixture 103 does not include a translucent cover, as the sensor 208 is intended to be exposed.

Figure 10:
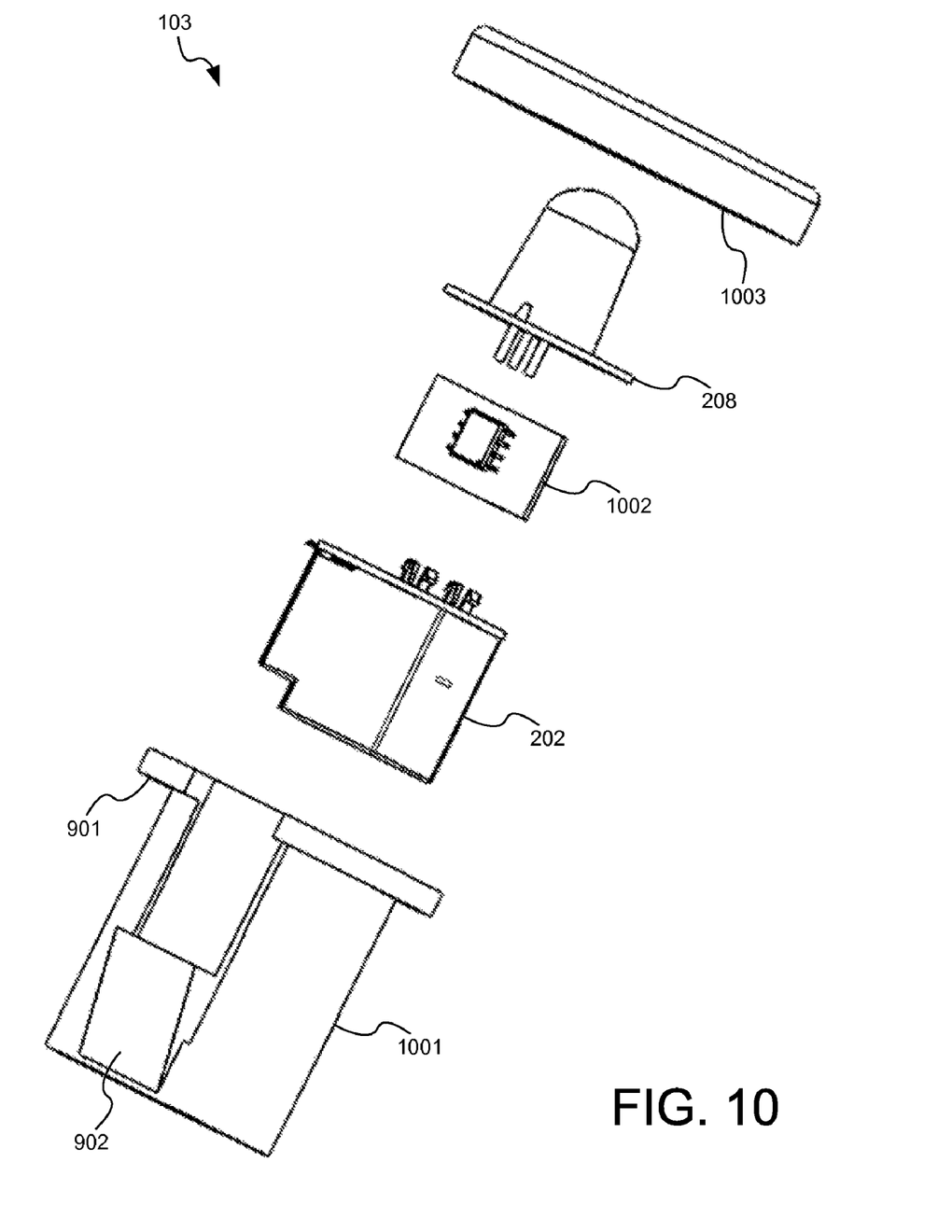
FIG. 10 is an exploded view of a data cable powered sensor according to one or more embodiments.

FIG. 10 is an exploded view of the example of the sensor fixture 103. The sensor fixture 103 includes a hollow body 1001, a data cable connector such as the RJ-45 connector 202, a circuit board 1002, a sensor 208, and a locking ring 1003. Unlike the LED cartridge 503 of the light fixture 102, the sensor 208 may not be an easily replaceable form. The circuit board 1002 includes only the components from the circuit 201 required to operate the sensor, meaning that the LED driver 207 is not present.

Figure 11A:
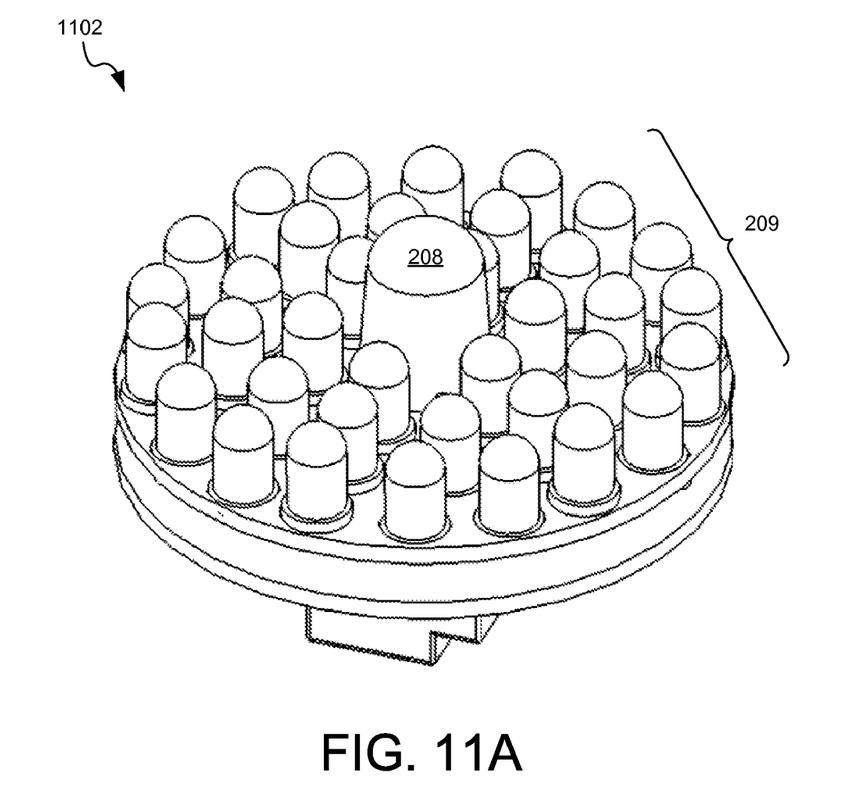
FIGS. 11A and 11B are perspective and top views respectively of an interior portion of a data cable powered light and sensor.
Figure 11B:
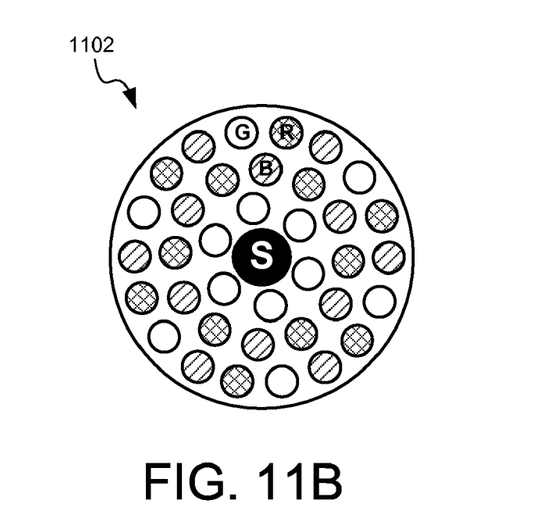

FIGS. 11A and 11B are perspective and top views respectively of an example of an interior portion 1102 of a combination light and sensor fixture. The interior portion 1102 is similar to an assembly including the LED cartridge 503 and the circuit board 502 of the light fixture 102. The LEDs 209 on the LED cartridge 503 have been repositioned to make room for a sensor 208. When assembled, the translucent cover 504 previously introduced with respect to the light fixture 102 may include an opening or unobstructed portion to allow the sensor 208 to sense the environment properly. The top view of FIG. 11B shows how the layout may accommodate different colored LEDs 209 as well as the sensor 208. If proximity to the LEDs 209 may affect the proper functioning of the sensor 208 (e.g., the sensor is a light sensor), then appropriate ameliorating actions may be taken, such as modifying the sensitivity of the sensor to particular frequencies of light, or shielding the space between the LEDs and the sensor.

Figure 12:
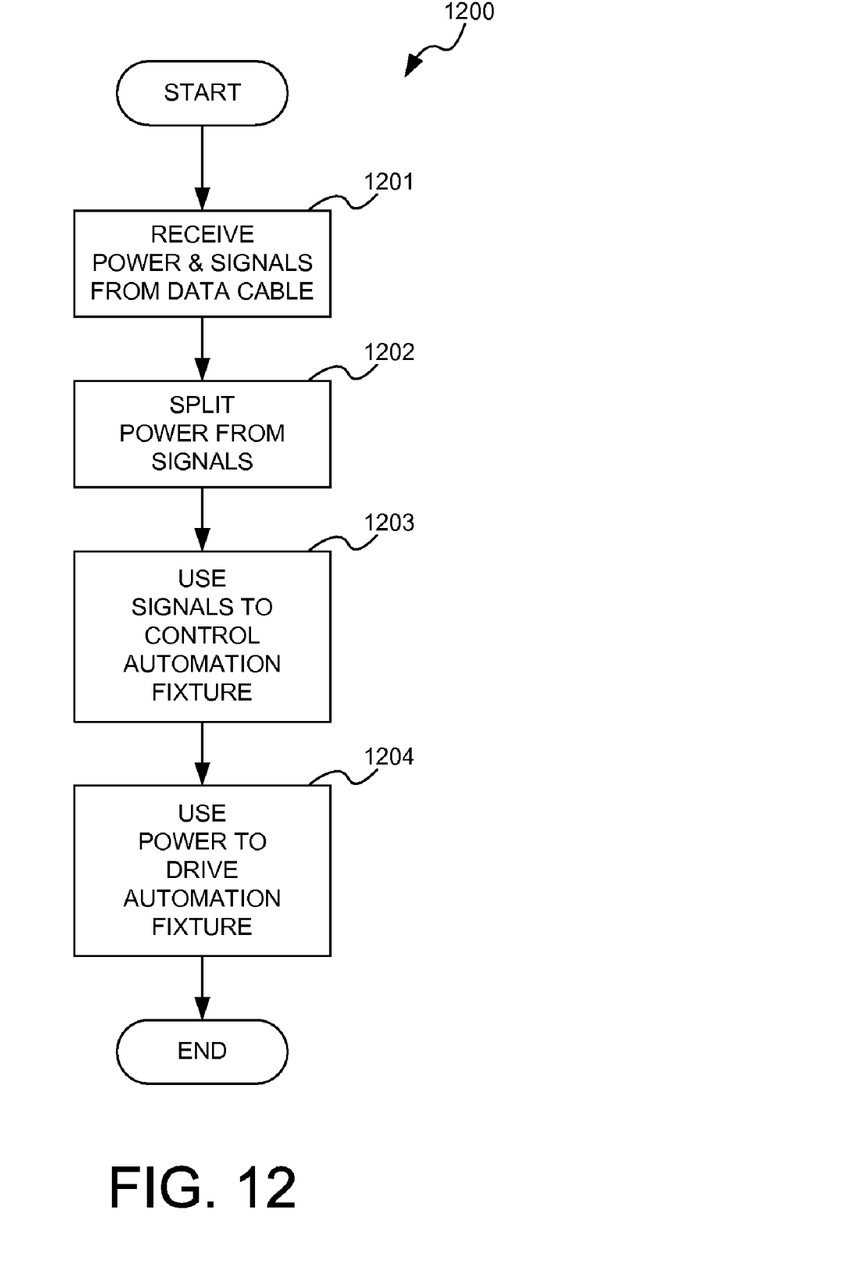
FIG. 12 is a flow diagram that depicts a process for utilizing a data cable to both power and control an automation fixture.

FIG. 12 depicts a process 1200 for utilizing a data cable 104 to both power and control an automation fixture, such as a light fixture 102 or a sensor fixture 103. The logical operations of the various implementations presented, including those of FIG. 12, may be in part (1) a sequence of computer-implemented acts or program modules running on a processor such as the processing device 206 and/or (2) interconnected machine logic circuits or circuit modules within the automation fixture. The implementation is a matter of choice dependent on the performance requirements of the device on which the embodiments are implemented. Accordingly, the logical operations making up the implementations are referred to variously as operations, structural devices, acts, or modules.

It will be recognized by one skilled in the art that these operations, structure devices, acts, and modules may be implemented in software, in firmware, in special purpose digital logic, and/or any combination thereof without deviating from the spirit and scope of the attached claims. Moreover, it will be apparent to those skilled in the art that the operations described may be combined, divided, reordered, skipped, and otherwise modified, also without deviating from the spirit and scope of the attached claims.

The process 1200 begins at operation 1201, where both power and control signals are received via the data cable 104. At operation 1202, the power is separated from the control signals, where the power is connected to a power controller such as the PoE power controller 205, and the control signals are connected to a network controller. The network controller, in conjunction with a processing device 206, controls the operation of the automation fixture at operation 1203. This may entail controlling the brightness of one or more LEDs 209 and/or receiving sensor information from a sensor 208, for example. The PoE power controller 205 utilizes the power from the data cable 104 to source a drive voltage that is then used to drive the LEDs 209 or power the sensor 208.

Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A sensor and light fixture powered by a data cable, comprising:

a housing defining a hollow interior body and defining an opening through which the data cable passes into the fixture, wherein the housing includes an exterior flange positioned to contact an exterior surface of a generally planar wallboard when the fixture is installed into an aperture within the wallboard, and includes a plurality of flexible barbed members that include surfaces that are spaced away from the exterior flange for engaging the wallboard between the barbed members and the exterior flange, wherein the barbed members are for contacting an interior surface of the wallboard when the fixture is installed, wherein the interior surface is generally parallel to the exterior surface;

a circuit board that includes a data cable receptacle for connecting to the data cable, and that includes a plurality of first contacts for electrically coupling to at least a portion of the data cable;

an LED cartridge including a plurality of second contacts arranged in a concentric configuration, wherein the second contacts are individually ring-shaped, with respective second contacts for physically contacting corresponding first contacts; and a power circuit receiving input power delivered via the data cable and producing a sensor voltage from the input power;

wherein the LED cartridge incorporates a sensor that is powered by the sensor voltage, wherein the LED cartridge includes a plurality of LEDs that are responsive to the sensor, wherein the LED cartridge has a network address for enabling communications through the power circuit between the LED cartridge and at least one LED cartridge and a computer; and a locking ring for engaging the exterior flange to secure the circuit board and the LED cartridge within the hollow interior body.

2. The sensor and light fixture of claim 1, further comprising:

a control circuit, wherein the control circuit receives a plurality of control signals via the data cable.

3. The sensor and light fixture of claim 2, wherein the plurality of control signals instruct the control circuit to modify a setting of the sensor.

4. The sensor and light fixture of claim 3, wherein modifying the setting of the sensor comprises modifying a sensitivity of the sensor.

5. The sensor and light fixture of claim 2, wherein:

wherein the plurality of LEDs are driven by an LED drive voltage produced by the power circuit and are controlled by the control circuit; and each of the first contacts are arranged in a single linear configuration.

6. The sensor and light fixture of claim 2, wherein the plurality of control signals are stored in a memory, the control signals corresponding to instructions which, when executed by the control circuit, cause the control circuit to:
  receive a sensor signal from the sensor, and adjust a setting of the plurality of LEDs as a result of the sensor signal being received.

7. The sensor and light fixture of claim 1, wherein the data cable receptacle is one of an RJ-45 data socket and an RJ-45 data plug.

8. The sensor and light fixture of claim 1, wherein the LEDs are generally arranged in a circular configuration, and wherein the sensor is centrally located within the plurality of LEDs.

9. The sensor and light fixture of claim 8, wherein the housing is generally cylindrical in configuration, with the exterior flange being attached to one end of the housing, wherein the opening is on an opposite end of the housing, and wherein the circuit board, the LED cartridge, and the locking ring are generally round in configuration.

10. The sensor and light fixture of claim 1, wherein the sensor comprises a light sensor.

11. The sensor and light fixture of claim 1, wherein the sensor comprises a motion sensor.

12. The sensor and light fixture of claim 1, wherein the sensor is operative to sense acoustic vibrations, isolate a beat therefrom, and to modulate operation of at least one light fixture in response to the beat operative to pulse or cycle the at least one light fixture through various colors in response to the beat.

13. The sensor and light fixture of claim 1, wherein the control circuit includes a processing device.

14. The sensor and light fixture of claim 13, wherein the control circuit further includes a network controller and a memory.

15. The sensor and light fixture of claim 14, wherein the memory stores instructions executable by the processing device which, when executed, cause the processing device to:
  receive a sensor signal from the sensor; and
  transmit a communication to a remote device via the network controller, wherein the communication is based on the sensor signal.

16. A method for utilizing a data cable to both power and control a sensor and light fixture, the method comprising:
  providing a housing that defines a hollow interior body and that defines an opening for accessing the interior body, wherein the housing includes an exterior flange positioned to contact an exterior surface of a wallboard when the fixture is installed into an aperture within the wallboard, and wherein the housing includes a plurality of integral flexible barbed members that include surfaces for contacting an interior surface of the wallboard when the fixture is installed;
  passing an end of the cable through the opening into the hollow interior body;
  providing a circuit board that includes a data cable receptacle for connecting to the data cable, and that includes a plurality of first contacts for electrically coupling to at least a portion of the data cable;
  providing an LED cartridge that includes a plurality of second contacts arranged in a concentric configuration, wherein the second contacts are individually ring-shaped;
  physically contacting the LED cartridge with the circuit board, so that respective second contacts couple electrically with corresponding first contacts, and so that the second contacts maintain physical and electrical contact respectively with the first contacts, regardless of a rotational orientation of the LED cartridge relative to the circuit board;
  inserting the circuit board and the LED cartridge into the hollow interior body of the housing;
  placing the housing into the aperture in the wallboard, and engaging the wallboard between the barbed members and the exterior flange of the housing;
  installing a locking ring onto the exterior flange, so as to secure the LED cartridge and the circuit board within the hollow interior body;
  receiving electrical power and a plurality of control signals from the data cable, wherein the control signals include at least one instruction;
  isolating the electrical power from the plurality of control signals;
  converting the electrical power to a sensor voltage and a light emitting diode (LED) drive voltage, wherein the LED cartridge is powered by the LED drive voltage and wherein the LED cartridge has a network address for enabling communications through a power circuit between the LED cartridge and other LED cartridges and a computer; and
  adjusting a sensitivity setting of an environmental sensor based on the instruction, wherein the sensor is shielded from the LED cartridge, and wherein the sensor is powered by the sensor voltage.

17. The method of claim 16, wherein the environmental sensor is a light sensor.

18. The method of claim 16, wherein the environmental sensor is a motion sensor.

19. A building automation component, comprising:
  a housing that defines a hollow interior body and that defines an opening through which a RJ-45 data cable passes into the interior body, wherein the housing includes an exterior flange positioned to contact an exterior surface of a generally planar wallboard when the component is installed into an aperture within the wallboard, and wherein the housing includes a plurality of integral flexible barbed members that include surfaces that are spaced away from the exterior flange for engaging the wallboard between the barbed members and the exterior flange, wherein the barbed members are for contacting an interior surface of the wallboard when the component is installed, wherein the interior surface is generally parallel to the exterior surface;
  a circuit board that includes an RJ-45 data cable receptacle for connecting to the data cable, and that includes a plurality of first contacts for electrically coupling to at least a portion of the data cable;
  a power circuit, wherein the power circuitry receives input power delivered via the RJ-45 data cable and produces a sensor voltage from the input power;
  a motion sensor, powered by the sensor voltage;
  a control circuit, wherein the control circuit receives a plurality of control signals via the RJ-45 data cable;
  an LED cartridge including a network address for enabling communications through the power circuit between the LED cartridge and at least one LED cartridge and a computer, and further including a plurality of second contacts arranged in a concentric configuration, wherein the second contacts are individually ring-shaped, and wherein the second contacts are spring-loaded telescoping contacts for holding the LED cartridge, with respective second contacts physically contacting corresponding first contacts;
wherein the circuit board and the LED cartridge are enclosed within the hollow interior body and the sensor is shielded from the LED cartridge; and
a locking ring installed onto the exterior flange, so as to secure the LED cartridge and the circuit board within the hollow interior body.

20. The building automation component of claim 19, wherein the housing is generally cylindrical in configuration, with the exterior flange attached to one end of the housing, wherein the opening is on an opposite end of the housing, and wherein the circuit board, the LED cartridge, and the locking ring are generally round in configuration.

\* \* \* \* \*